US008192704B1

(12) United States Patent  (10) Patent No.: US 8,192,704 B1
Kim  (45) Date of Patent: Jun. 5, 2012

(54) SPENT NUCLEAR FUEL RECYCLING WITH PLASMA REDUCTION AND ETCHING

(75) Inventor: Yong Ho Kim, Los Alamos, NM (US)

(73) Assignee: The United States of America as represented by the Department of Energy, Washington, DC (US)

( * ) Notice: Subject to any disclaimer, the term of this patent is extended or adjusted under 35 U.S.C. 154(b) by 0 days.

(21) Appl. No.: 13/035,087

(22) Filed: Feb. 25, 2011

(51) Int. Cl.
  *C01G 56/00* (2006.01)
  *C22B 60/02* (2006.01)
(52) U.S. Cl. .................... 423/3; 204/157.15; 204/157.3; 204/157.43
(58) Field of Classification Search .. 423/3; 204/157.43
  See application file for complete search history.

(56) References Cited

U.S. PATENT DOCUMENTS

| 4,202,861 | A | 5/1980 | Bourgeois et al. |
| 4,522,794 | A | 6/1985 | Hochel et al. |
| 6,699,398 | B1 | 3/2004 | Kim |
| 7,172,741 | B2 | 2/2007 | Kawamura et al. |
| 7,208,129 | B2 | 4/2007 | Amamoto et al. |
| 7,323,153 | B2 | 1/2008 | Amamoto et al. |
| 7,445,760 | B2 | 11/2008 | Fukasawa et al. |
| 2010/0126874 | A1 | 5/2010 | Watanabe et al. |

FOREIGN PATENT DOCUMENTS

| GB | 1198454 A | * | 7/1970 |
| WO | WO9727595 | * | 7/1997 |

OTHER PUBLICATIONS

Veilleux et al, Etching of UO2 in NF3 RF Plasma Glow Discharge, Journal of Nuclear Materials, 2000, pp. 315-324, vol. 277, Elsevier Science B.V.
Windarto et al, Decontamination Process Using CF4-O2 Microwave Discharge Plasma at Atmospheric Pressure, Journal of Nuclear Science and Technology, Sep. 2000, pp. 787-792, vol. 37, No. 9, Atomic Energy Society of Japan.
Yang et al, Etching of Uranium Oxide with a Non-Thermal Atmospheric Pressure Plasma, Journal of Nuclear Materials, 2004, pp. 134-139, vol. 324, Elsevier Science B.V.

* cited by examiner

*Primary Examiner* — Melvin C Mayes
*Assistant Examiner* — Melissa Stalder
(74) *Attorney, Agent, or Firm* — Thomas S. O'Dwyer; James C. Durkis; John T. Lucas

(57) ABSTRACT

A method of extracting uranium from spent nuclear fuel (SNF) particles is disclosed. Spent nuclear fuel (SNF) (containing oxides of uranium, oxides of fission products (FP) and oxides of transuranic (TRU) elements (including plutonium)) are subjected to a hydrogen plasma and a fluorine plasma. The hydrogen plasma reduces the uranium and plutonium oxides from their oxide state. The fluorine plasma etches the SNF metals to form $UF_6$ and $PuF_4$. During subjection of the SNF particles to the fluorine plasma, the temperature is maintained in the range of 1200-2000 deg K to: a) allow any $PuF_6$ (gas) that is formed to decompose back to $PuF_4$ (solid), and b) to maintain stability of the $UF_6$. Uranium (in the form of gaseous $UF_6$) is easily extracted and separated from the plutonium (in the form of solid $PuF_4$). The use of plasmas instead of high temperature reactors or flames mitigates the high temperature corrosive atmosphere and the production of $PuF_6$ (as a final product). Use of plasmas provide faster reaction rates, greater control over the individual electron and ion temperatures, and allow the use of $CF_4$ or $NF_3$ as the fluorine sources instead of $F_2$ or HF.

8 Claims, 3 Drawing Sheets

SPENT NUCLEAR FUEL RECYCLING WITH PLASMA REDUCTION AND ETCHING

STATEMENT REGARDING FEDERALLY SPONSORED RESEARCH OR DEVELOPMENT

The United States Government has rights in this invention pursuant to Contract No. DE-AC52-06NA25396 between the United States Department of Energy National Nuclear Security Administration and Los Alamos National Security, LLC for the operation of Los Alamos National Laboratory.

CROSS-REFERENCE TO RELATED APPLICATIONS

Not Applicable

REFERENCE TO A "SEQUENCE LISTING", A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

Not Applicable

BACKGROUND OF THE INVENTION

1) Field of the Invention

The present invention relates generally to a method of recycling spent nuclear fuel (SNF). More particularly, the present invention relates to a method of recycling SNF via an atmospheric-pressure volume plasma fluoride volatility process that removes uranium in the form of gaseous uranium hexafluoride ($UF_6$) while retaining the plutonium in the form of solid plutonium tetrafluoride ($PuF_4$). The remaining products including PuF4, which are reduced by volume significantly, will be stored or recycled by conventional other technologies such as PUREX.

2) Description of Related Art

Light-water nuclear reactors in the U.S. generate about 2000 metric tons of spent nuclear fuel (SNF) every year. SNF is nearly 96 percent uranium. Separating the uranium from the SNF would dramatically reduce the volume of SNF that would subsequently need to be disposed of. Aqueous chemical recovery processes such as PUREX dissolve the SNF using liquid acids, generating large amounts of liquid radioactive waste as a result.

Fluoride volatility methods have been used for uranium separation and recovery. It is known in the art to produce fluorides of uranium and plutonium using a "flame fluoride volatility" process. In such a process, metals are reacted with fluorine gas in a high temperature reactor to form the fluorides. Disadvantages of the flame fluoride volatility process are material problems associated with the high temperature corrosive environment and the production of $PuF_6$, (a gas formed at high temperatures) rather than the solid $PuF_4$ (formed at lower temperatures).

U.S. Pat. No. 4,202,861 discloses flame fluorination followed by fluidized bed fluorination of irradiated nuclear fuels to produce uranium hexafluoride ($UF_6$) and plutonium hexafluoride ($PuF_6$). The method teaches re-fluorination of any plutonium tetrafluoride ($PuF_4$) to produce plutonium hexafluoride ($PuF_6$) at high temperature (>2000 deg K).

U.S. Pat. No. 4,522,794 discloses flame fluorination of $UO_2$ and $PuO_2$ to form hexafluorides. $PuF_4$ is converted to $PuF_6$ through the use of catalysts.

U.S. Pat. No. 6,699,398 discloses plasma fluorination of actinide oxides from a substrate surface. Use of rf and microwave plasma generators at low pressure (sub-atmospheric) were disclosed.

U.S. Pat. No. 7,172,741 discloses flame fluorination of spent nuclear fuel to produce $UF_6$. Any $PuF_4$ that is produced is recovered via two methods, and reconverted to $PuF_6$. The first method of recovering $PuF_4$ is adsorption onto an adsorption tower, followed by oxidative conversion, and re-fluorination (to form $PuF_6$). In the second method, the $PuF_4$ is captured at the bottom of the reactor tower, where it is oxidated, and re-fluorinated (to form $PuF_6$).

U.S. Pat. No. 7,208,129 discloses a three step flame fluorination of spent oxide fuel: i) HF fluorination to form $UF_4$ and $PuF_4$; ii) low temperature $F_2$ fluorination to convert $UF_4$ to $UF_6$; iii) high temperature $F_2$ fluorination to form $UF_6$ and $PuF_6$.

U.S. Pat. No. 7,323,153 discloses a two step flame fluorination process: i) HF fluorination to form $UF_4$ and $PuF_3$; ii) $F_2$ fluorination to form $UF_6$ and $PuF_6$.

U.S. Pat. No. 7,445,760 discloses fluorination of SNF to remove a portion of the uranium as $UF_6$. The remaining products (uranium, plutonium, etc.) are dissolved in nitric acid to recover the plutonium.

Published U.S. patent application 2010/0126874 discloses flame fluorination of spent nuclear fuel to form $UF_6$, enabling removal of the bulk of the uranium. The remainder is processed by an electrolysis method to separate and extract remaining metals.

Journal article, "Etching of $UO_2$ in $NF_3$ RF plasma glow discharge", Veilleux et al, Journal of Nuclear Materials, vol. 277, (2000), pages 315-324, discloses the use of a low pressure (sub-atmospheric) RF plasma ($NF_3$ gas) to decontaminate depleted uranium oxide from stainless-steel substrates.

Journal article, "Decontamination Process Using $CF_4$—$O_2$ Microwave Discharge Plasma at Atmospheric Pressure", Windarto et al, Journal of Nuclear Science and Technology, Vol. 37, No. 9, pages 787-792, (2000), discloses use of atmospheric pressure microwave discharge plasma to fluorinate cobalt oxide deposited on a surface.

Journal article, "Etching of uranium oxide with a non-thermal atmospheric pressure plasma", Yang et al, Journal of Nuclear Materials, Vol. 324, pages 134-139, (2004), discloses use of atmospheric RF discharge plasma to etch uranium oxide deposited on a surface.

BRIEF SUMMARY OF THE INVENTION

The subject invention resolves the disadvantages of the flame fluoride volatility method by use of plasma reduction and plasma fluorination. Spent nuclear fuel (SNF) particles (containing oxides of uranium, oxides of fission products (FP) and oxides of transuranic (TRU) elements (including plutonium)) are subjected to a hydrogen plasma (which reduces the SNF metal oxides from their oxide state) and a fluorine plasma (which etches the SNF metals). The uranium reacts with the fluorine to produce gaseous $UF_6$. During subjection of the SNF particles to the fluorine plasma, the temperature is maintained in the range of 1200-2000 deg K to: i) allow any $PuF_6$ (gas) that is formed to decompose back to $PuF_4$ (solid), and ii) maintain stability of the $UF_6$ gas. Uranium (in the form of gaseous $UF_6$) is easily extracted and separated from the plutonium (in the form of solid $PuF_4$). The solid PuF4 may be recycled by means well known in the art, e.g. wet chemical methods such as PUREX. The use of plasmas instead of high temperature reactors or flames mitigates the high temperature corrosive atmosphere and the production of $PuF_6$ (as a final product). Use of plasmas provide faster reaction rates, greater control over the individual electron and ion temperatures, and allow the use of $CF_4$ or $NF_3$ as fluorine sources instead of $F_2$ or HF.

BRIEF DESCRIPTION OF THE SEVERAL VIEWS OF THE DRAWING

In the figures, like or similar elements (such as spent nuclear fuel particles 3) utilize the same reference characters throughout the various views.

DETAILED DESCRIPTION OF THE INVENTION

Figure 1A:
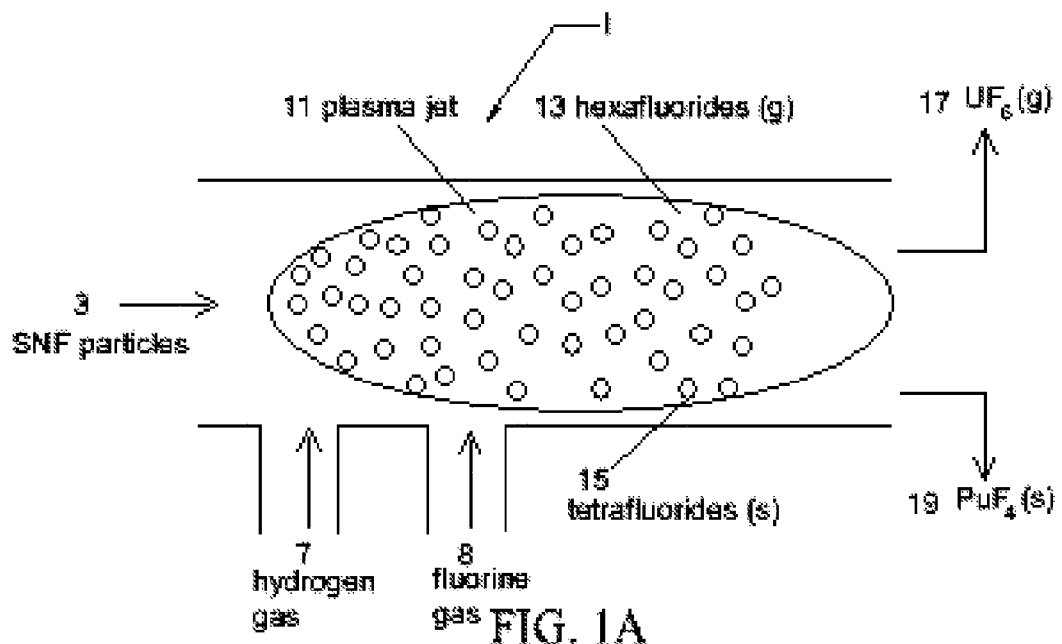
FIG. 1A illustrates embodiments of the present invention with respect to subjecting spent nuclear fuel (SNF) particles to sequential hydrogen and fluorine plasmas.

| Acronyms | |
|---|---|
| FP | Fission Product |
| NTP | Non thermal plasma—a plasma in which the various plasma species are not in thermal equilibrium. |
| PUREX | Plutonium-URanium EXtraction—aqueous nuclear reprocessing method for the recovery of uranium and plutonium from used nuclear fuel. |
| RF | radiofrequency |
| SNF | Spent Nuclear Fuel |
| TRU | Transuranic elements |

The present invention uses a two plasma chemical process. Spent nuclear fuel particles (containing oxides of uranium, oxides of fission products (FP) and oxides of transuranic (TRU) elements (including plutonium)) are subjected to a hydrogen plasma (which reduces the SNF metal oxides from their oxide state) and a fluorine plasma (which etches the SNF metals). The diameter of the SNF particles are preferably less than or equal to 100 micrometres (μm). The use of plasmas (particularly non-thermal plasmas) instead of high temperature reactors or flames mitigates the high temperature corrosive atmosphere and the production of $PuF_6$ (as a final product). Use of plasmas provides faster reaction rates. Reactive species, such as H and F atoms produced by a plasma increase reaction rates significantly compared to $H_2$ and $F_2$ molecule reactions. Plasmas enable process selectivity, providing greater control over the individual electron and ion temperatures, compared to relatively constant flame temperatures in flame fluoride volatility processes. Plasmas enable greater control, since plasma methods do not rely on stoichiometric mixtures of $F_2$ and SNF. Source gas for the hydrogen plasma is preferably $H_2$, but other sources of hydrogen may be utilized, as would be deemed suitable by a person with ordinary skill in the art. Source gas for the fluorine plasma is preferably a nontoxic/inexpensive gas such as $CF_4$ or $NF_3$ (instead of toxic/corrosive/expensive/difficult-to-handle $F_2$ or HF), but these ($F_2$ or HF) or other sources of fluorine (e.g. $SF_6$ or combination of fluorine source gases) may be utilized, as would be deemed suitable by a person with ordinary skill in the art.

In the present invention, spent nuclear fuel particles are subjected to a hydrogen plasma. In preferred embodiments, the SNF particles are injected into the hydrogen plasma. The hydrogen atoms diffuse into the SNF metal-oxide layers, which then are turned (reduced) into metal layers. Reducing the metal oxides (particularly oxides of uranium and plutonium) before they undergo etching (to form fluorides), precludes the formation of intermediary oxyfluoride species.

Reduction:

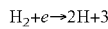

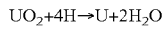

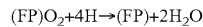

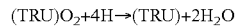

Subjecting the SNF metals to a fluorine plasma etches the metals (fluorination). The fluorine atoms in the plasma are preferably generated from an inert feed (e.g. $CF_4$, $NF_3$). The uranium reacts with the fluorine atoms to produce gaseous $UF_6$. Most fluorinated fission products and transuranics are non-volatiles. Plutonium etching can occur, but is over 10 times slower than that of uranium etching. During subjection of the SNF particles to the fluorine plasma, the temperature is maintained in the range of 1200-2000 deg K, to: i) allow any $PuF_6$ (gas) that is formed to decompose back to $PuF_4$ (solid), and ii) maintain stability of the $UF_6$ gas. Maintaining plutonium in the form of $PuF_4$ (solid) instead of $PuF_6$ (gas) enables easier separation from the uranium hexafluorides (gas), reducing plutonium proliferation possibilities. Uranium (in the form of gaseous $UF_6$) is easily extracted and separated from the plutonium (in the form of solid $PuF_4$). The PuF4 may be confined with other $(TRU)F_4$ and $(FP)F_4$ solid products. The solid PuF4 may be recycled by means well known in the art, e.g. wet chemical methods such as PUREX.

Etching:

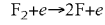

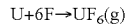

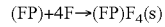

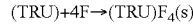

In various embodiments, the SNF particles are first subjected to a hydrogen plasma, followed by subjecting the SNF to a fluorine plasma. In other embodiments, the SNF particles are simultaneously subjected to the hydrogen and fluorine plasmas. Simultaneous subjection to hydrogen and fluorine plasmas would be more compact and efficient in terms of throughput. In the present invention, the SNF are volumetrically subjected to the plasmas. Plasmas have been used for the surface treatment of materials present on a substrate surface (e.g. U.S. Pat. No. 6,699,398 by Yong-Soo Kim discloses plasma etching of actinide oxides from a substrate). In contrast, in the present invention, the entire volumes of the SNF particles are subjected to the plasmas. Plasma treatment of a substrate surface is prone to quenching in the decomposition process as non-volatile chemical products build up on or near the surface. Besides the benefit of higher surface area to volume ratio (greater exposure to the plasma) in a volumetric plasma process, there is little or no issue with quenching in volumetric plasma processes when compared to surface plasma processes. The plasmas may be generated by various means known to those persons having ordinary skill in the art. In preferred embodiments, plasmas at atmospheric pressure are used. In preferred embodiments the plasmas are non-thermal plasmas (NTPs). With NTPs, the various plasma species are not in thermal equilibrium. In NTPs, the electrons, ions, and neutral species have different temperatures, with the less massive electrons having the highest temperature (e.g. 1-10 eV). Via these reactive species, one can direct electrical energy into favorable gas chemistry through energetic electrons. In various embodiments, the plasmas may be generated by microwave plasma generators as would be known by those with ordinary skill in the art. Microwave plasma generators would preclude the glow-to-arc transition problems with capacitively coupled atmospheric plasmas. Atmospheric pressure continuous microwave plasmas have several advantages including: high density ($>10^{15}$ $cm^{-3}$), volume plasma, electrodeless, and stability with electronegative gases (e.g. $CF_4$, $NF_3$, $F_2$, HF) and solid powders injection. In further preferred embodiments, the plasmas are generated by pulsed microwave plasma generators. Use of a non-thermal pulsed microwave plasma generator enables control of the characteristic energy transfer time of electron to neutral gas molecules. Because the collisional energy transfer time is about 1 µs at atmospheric pressure, hot electrons (~10 eV)/cold ion (~500 K) plasmas can be produced with a pulse shorter than 1 µs. The NTP properties may be fully controlled by magnetron drive pulse parameters (e.g. pulse height, pulse width, duty ratio). As would be known to persons having ordinary skill in the art, a pulsed microwave plasma generator would consist of a pulse modulator, pulsed magnetron, waveguides for power delivery, and a coaxial reactor coupled to a jet nozzle. High frequency structure simulation (HFSS) software would be used to optimize the quality factor of the coaxial resonator and jet nozzle to obtain the highest electric field at the top of the resonator nozzle.

Various embodiments of a microwave plasma SNF processing system 1 are described hereunder with reference to FIG. 1A. In FIG. 1A, SNF particles 3 (comprising oxides of uranium (U), oxides of transuranic elements (TRU) (including plutonium (Pu)) and oxides of fission products (FP) are subjected to upstream region of plasma jet 11 (where hydrogen-enriched plasma formed by hydrogen gas injection 7 reduces the U, TRU, and FP oxides). The SNF particles 3 are then subjected to downstream region of plasma jet 11 (where fluorine-enriched plasma formed by fluorine gas injection 8 forms gaseous (volatile) hexafluorides 13 ($UF_6$ and $PuF_6$) and solid (non-volatile) tetra-fluorides 15 (($TRU)F_4$ and $(FP)F_4$). During subjection of the SNF particles 3 to the plasma jet 11, the temperature is maintained in the range of 1200-2000 deg K, to: i) allow any $PuF_6$ (gas) that is formed to decompose back to $PuF_4$ (solid) 19, and ii) maintain stability of the $UF_6$ gas 17. Gaseous $UF_6$ 17 may be thus be easily removed from the system. Solid $PuF_4$ 19 may be recycled (e.g. via a wet chemical process).

Figure 1B:
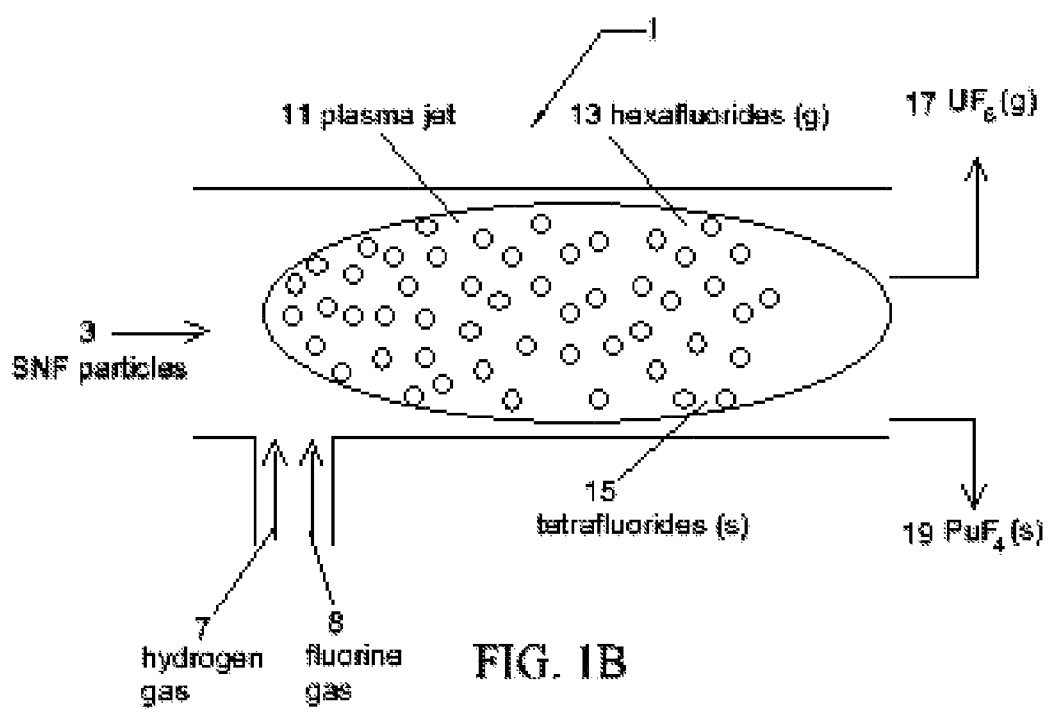
FIG. 1B illustrates embodiments of the present invention with respect to subjecting spent nuclear fuel (SNF) particles to simultaneous hydrogen and fluorine plasmas.

Various embodiments of a microwave plasma SNF processing system 1 are described hereunder with reference to FIG. 1B. In FIG. 1B, SNF particles 3 (comprising oxides of uranium (U), oxides of transuranic elements (TRU) (including Plutonium (Pu)), and oxides of fission products (FP)) are subjected simultaneously to hydrogen/fluorine mixed plasma jet 11 (hydrogen-enriched plasma formed by hydrogen gas injection 7 and fluorine-enriched plasma formed by fluorine gas injection 8). Reaction of the SNF particles 3 with hydrogen/fluorine mixed plasma jet 11 reduces the U, TRU, and FP oxides, and forms gaseous (volatile) hexafluorides 13 ($UF_6$ and PuF6) and solid (non-volatile) tetra-fluorides 15 (($TRU)F_4$ and $(FP)F_4$) at the same time. During subjection of the SNF particles 3 to the hydrogen/fluorine mixed plasma jet 11, the temperature is maintained in the range of 1200-2000 deg K, to: i) allow any $PuF_6$ (gas) that is formed to decompose back to $PuF_4$ (solid) 19, and ii) maintain stability of the $UF_6$ gas 17. Gaseous $UF_6$ 17 may be thus be easily removed from the system. Solid $PuF_4$ 19 may be recycled (e.g. via a wet chemical process).

Figure 2:
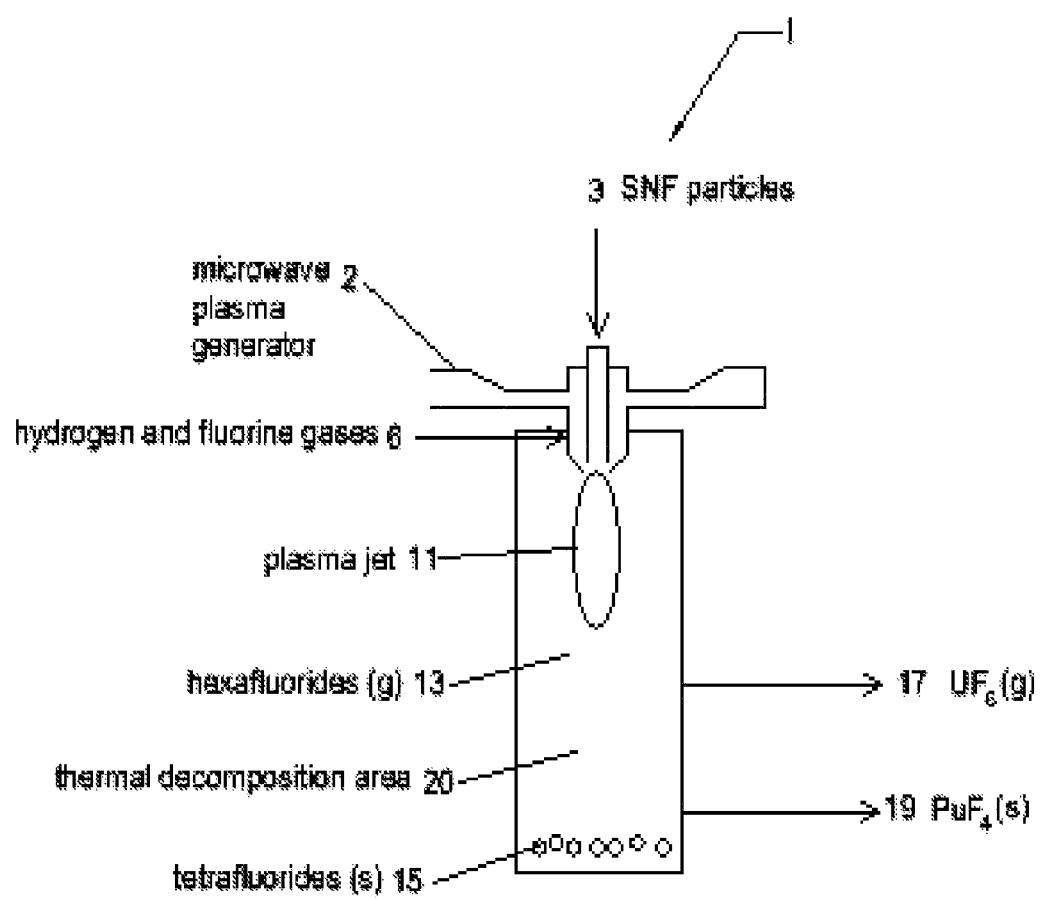
FIG. 2 illustrates embodiments of the present invention with respect to the microwave plasma generator and fluorination products.

Various embodiments of a microwave plasma SNF processing system 1 are described hereunder with reference to FIG. 2. Microwave plasma generator 2 receives hydrogen and fluorine source gases 6 from which plasma jet 11 (comprising hydrogen and fluorine plasmas) is generated. Spent nuclear fuel (SNF) particles 3 (comprising oxides of uranium (U), oxides of transuranic elements (TRU) (including Plutonium (Pu)), and oxides of fission products (FP)) are injected (via particle injector 23) into hydrogen/fluorine plasma jet 11. Gaseous (volatile) hexafluorides 13 ($UF_6$ and $PuF_6$)) and solid (non-volatile) tetra-fluorides 15 ($(FP)F_4$, $(TRU)F_4$) result from the plasmas' reaction with SNF particles 3. During subjection of the SNF particles 3 to the hydrogen/fluorine plasma jet 11, the temperature in thermal decomposition area 20 is maintained in the range of 1200-2000 deg K, to: i) allow any $PuF_6$ (gas) that is formed to decompose back to $PuF_4$ (solid) 19, and ii) maintain stability of the $UF_6$ gas 17. Gaseous $UF_6$ 17 may be thus be easily removed from the system. Solid $PuF_4$ 19 may be recycled (e.g. via a wet chemical process).

Figure 3:
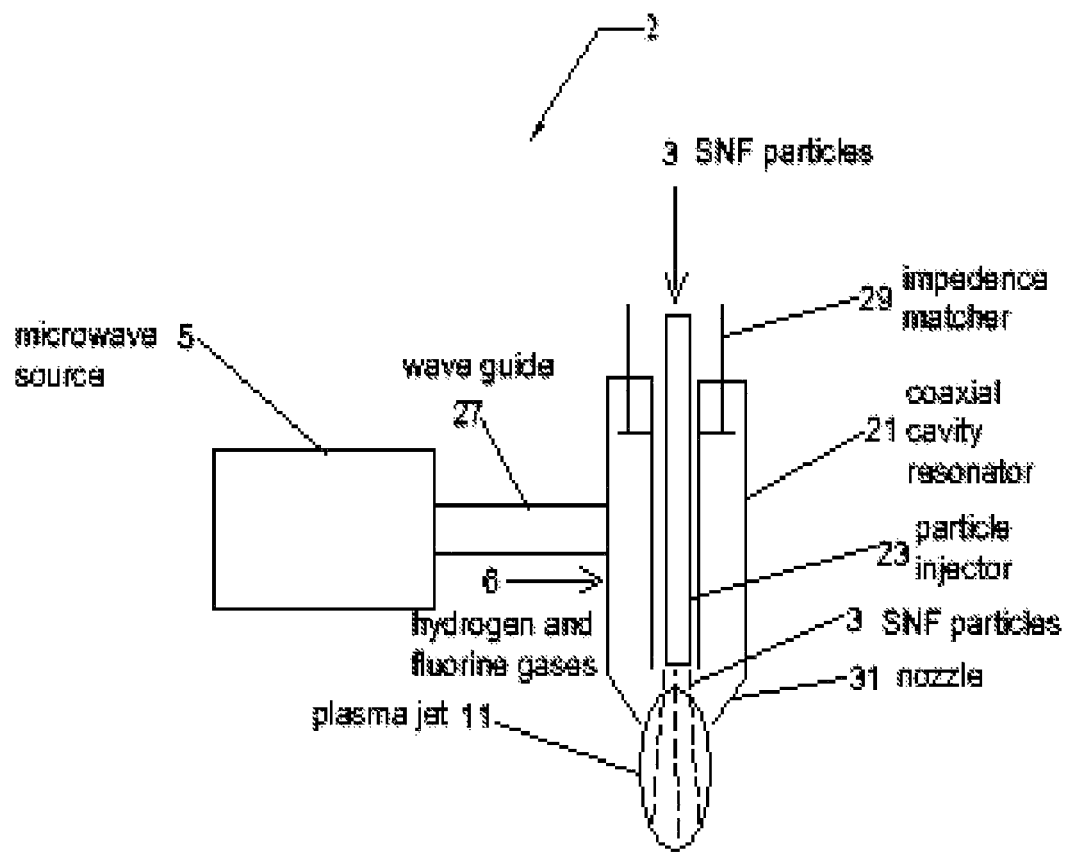
FIG. 3 illustrates a more detailed view of the embodiments of FIG. 2 with respect to the microwave plasma generator.

A more detailed description of the embodiment of FIG. 2 is described hereunder with reference to FIG. 3. Spent nuclear fuel (SNF) particles 3 (comprising oxides of uranium (U), oxides of transuranic elements (TRU) (including Plutonium (Pu)), and oxides of fission products (FP)) are injected into microwave plasma generator 2. Microwaves from microwave source 5 are transmitted via wave guide 27 to coaxial cavity resonator 21, which receives hydrogen and fluorine gases 6. Coaxial cavity resonator 21, coupled with impedance matcher 29, guides microwaves down to exit of nozzle 31, where microwaves converge and generate hydrogen/fluorine plasma jet 11. SNF particles 3 are injected into hydrogen/fluorine plasma jet 11 via particle injector 23. Hydrogen/fluorine plasma jet 11 interacts with SNF particles 3.

Obviously numerous modifications and variations of the present invention are possible in the light of the above teachings. It is therefore to be understood that within the scope of the appended claims the invention may be practiced otherwise than as specifically described therein.

What is claimed is:

1. An atmospheric pressure plasma fluoride method of extracting uranium from spent nuclear fuel (SNF) particles (containing oxides of uranium (U), fission products (FP), and transuranic (TRU) elements (including plutonium)), comprising:
   a) volumetrically subjecting said SNF particles to an atmospheric pressure pulsed microwave induced plasma of hydrogen to reduce said oxides of uranium, FP, and TRU from their oxide state;
   b) volumetrically subjecting said SNF particles to an atmospheric pressure pulsed microwave induced plasma of fluorine to form gaseous uranium hexafluoride ($UF_6$), solid FP tetrafluorides (($FP)F_4$), and solid TRU tetrafluorides (($TRU)F_4$);
   c) during subjection of said SNF particles to said fluorine plasma, maintaining the temperature in the range of 1200-2000 K to: i) allow any $PuF_6$ (gas) that is formed to decompose back to $PuF_4$ (solid) and ii) maintain stability of said $UF_6$ gas; and
   d) removing said $UF_6$.

2. The method according to claim 1 wherein:
   said subjecting of said SNF particles to plasmas of hydrogen and fluorine occurs simultaneously.

3. The method according to claim 1 wherein:
   said subjecting of said SNF particles to a plasma of hydrogen occurs prior to said subjecting of said SNF particles to a plasma of fluorine.

4. The method according to claim 1 wherein:
   said plasmas of hydrogen and fluorine are non-thermal plasmas (NTPs).

5. The method according to claim 1 wherein:
   the diameter of said SNF particles is less than or equal to 100 micrometres (µm).

6. The method according to claim 1 wherein:
   said fluorine plasma is formed from a gas selected from the list of gases consisting of $F_2$, HF, $CF_4$, $NF_3$, $SF_6$, and any combination of the foregoing.

7. The method according to claim 1 wherein:
   said step of subjecting SNF particles to a hydrogen plasma comprises injecting said SNF particles into said hydrogen plasma.

8. The method according to claim 1 further comprising:
   recycling said solid $PuF_4$ using a wet chemical method.

* * * * *